US012051846B2

(12) United States Patent
Karhu

(10) Patent No.: US 12,051,846 B2
(45) Date of Patent: Jul. 30, 2024

(54) RADIO FREQUENCY RESONATOR STRUCTURE

(71) Applicant: Nokia Solutions and Networks Oy, Espoo (FI)

(72) Inventor: Kimmo Kalervo Karhu, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/212,982

(22) Filed: Jun. 22, 2023

(65) Prior Publication Data

US 2023/0420822 A1 Dec. 28, 2023

(30) Foreign Application Priority Data

Jun. 23, 2022 (FI) ...................................... 20225580

(51) Int. Cl.

| | |
|---|---|
| ***H01P 7/10*** | (2006.01) |
| ***H01P 1/205*** | (2006.01) |
| ***H01P 1/207*** | (2006.01) |
| ***H01P 1/208*** | (2006.01) |
| ***H01P 11/00*** | (2006.01) |

(52) U.S. Cl.

CPC ................ *H01P 7/10* (2013.01); *H01P 1/205* (2013.01); *H01P 1/207* (2013.01); *H01P 1/208* (2013.01); *H01P 1/2084* (2013.01); *H01P 1/2088* (2013.01); *H01P 11/008* (2013.01)

(58) Field of Classification Search

CPC ...... H01P 1/208; H01P 1/2084; H01P 1/2088; H01P 1/207; H01P 1/205; H01P 1/2053; H01P 1/2056; H01P 7/10

USPC .............. 333/202, 206–212, 219, 219.1, 227

See application file for complete search history.

(56) References Cited

U.S. PATENT DOCUMENTS

2020/0227804 A1* 7/2020 Basavarajappa ...... H01P 1/2056

FOREIGN PATENT DOCUMENTS

| | | |
|---|---|---|
| CN | 110400996 A | 11/2019 |
| CN | 111146539 A | 5/2020 |
| CN | 213401455 U | 6/2021 |
| KR | 20130063684 A | 6/2013 |
| WO | WO 2021/135643 A1 | 7/2021 |
| WO | WO 2021/189377 A1 | 9/2021 |

OTHER PUBLICATIONS

Shishido, Daichi, et al., "Development of an Air-filled SIW Filter with Wideband Spurious Suppression", IEEE International Symposium on Radio Frequency Integration Technology (RFIT), Sep. 2020, pp. 13-15.

* cited by examiner

*Primary Examiner* — Rakesh B Patel

(74) *Attorney, Agent, or Firm* — Harrington & Smith

(57) ABSTRACT

There is provided a dielectric resonator structure including at least a first resonator having a body including a first, a second and a third internal cavities, wherein the first cavity is arranged between the second and the third cavity, and the body further includes a first hole extending from the first cavity through the body, and a first opening arranged between the second and the third cavity.

16 Claims, 9 Drawing Sheets

RADIO FREQUENCY RESONATOR STRUCTURE

FIELD

The invention relates to a field of radio frequency resonators, especially dielectric resonators.

BACKGROUND

Dielectric resonators are widely used to form radio frequency (RF) filters for radio transmitters and radio receivers. The dielectric resonators are typically made of ceramic material that provides oscillation waves and resonates on radio wave frequencies. The ceramic resonators may be combined to each other to form a ceramic filter having desired pass-band characteristics. An additive manufacturing enables a new way to manufacture structural features of the ceramic resonators that eliminates many drawbacks of the known solutions.

BRIEF DESCRIPTION

The present invention is defined by the subject matter of the independent claim. Embodiments are defined in the dependent claims.

The embodiments and features, if any, described in this specification that do not fall under the scope of the independent claim are to be interpreted as examples useful for understanding various embodiments of the invention.

LIST OF DRAWINGS

Example embodiments of the present invention are described below, by way of example only, with reference to the accompanying drawings, in which FIGS. 1A and 1B illustrate a dielectric resonator structure according to an embodiment of the invention;

DESCRIPTION OF EMBODIMENTS

Figure 1A:
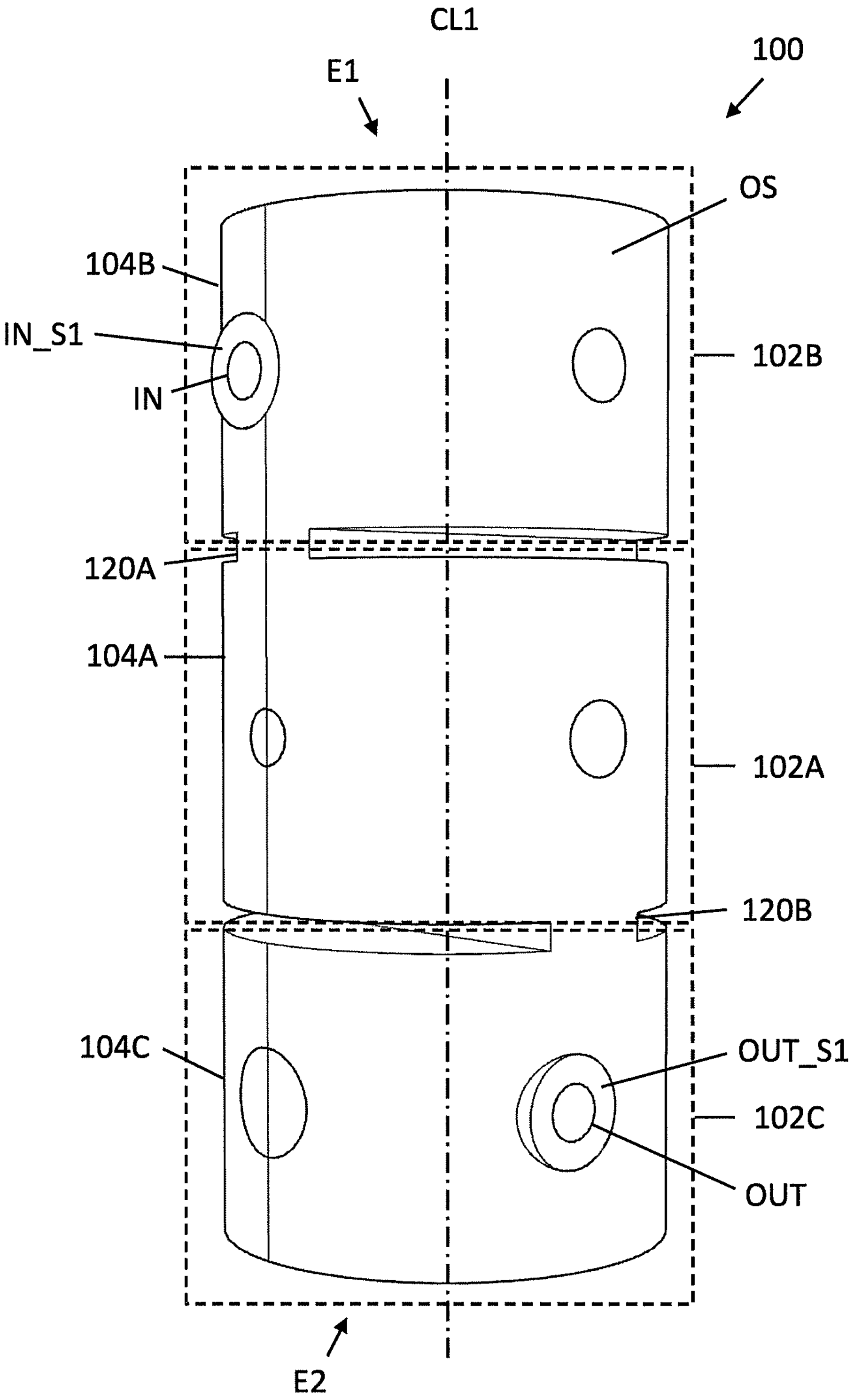

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Resonators are used in a telecommunication industry to form radio frequency (RF) filters. The filters are used in radio transmitters and receivers and are typically made of ceramic material capable of resonating on radio wave frequencies. A single mode resonator may resonate on one resonating frequency, a dual-mode resonator may resonate on two resonating frequencies, and a triple-mode resonator may resonate on three resonating frequencies, for example. The dielectric resonators, made of the ceramic material, may be combined to each other to form a ceramic filter having desired pass-band characteristics.

New manufacturing methods enable new ways to manufacture the ceramic resonators. An additive manufacturing (AM) is one of the new manufacturing methods that can be used to manufacture the ceramic resonators. For example, the lithography-based ceramic manufacturing (LCM) technology allows the manufacturing of the ceramic resonator structure with a high flexibility regarding a shape and a design. Many mechanical features that have not been possible or reasonable to manufacture earlier are now possible. This enables manufacturing of the resonator structures that alleviate many drawbacks of the know solution.

The term "resonator structure" in this application refers to an entity comprising one or more resonators in the same structure. The resonator structure forms the FR-filter. A type of the dielectric resonator(s) may be the single, the dual, the triple mode or a single mode coaxial resonator, for example. The different types of the resonators and their function used to form the RF-filters are widely known and obvious to the skilled person and therefore not presented in detail in this application.

The term "inner cavity" in this application refers to the air cavity which is formed inside the resonator structure. In other words, the inner cavity may not be just a hole on an outer surface of the resonator. The inner cavity may comprise an opening from the cavity through a body of the resonator but still the main volume of the cavity is inside the resonator body. Hence, the opening may be substantially smaller than the actual cavity inside the resonator.

The dielectric resonator structure may be made of the ceramic material which is dielectric (non-conductive). Therefore, a conductive coating may be applied in some parts of the structure to get a conductive layer on the structure. The conductive layer may comprise silver, for example. The ceramic material has low loss and high dielectric constant value (Dk-value) enabling a low insertion loss (IL) and a small size. The ceramic material used in the resonator structure according to the invention may have DK-value~43 and FQ~40000, for example.

Figure 1B:
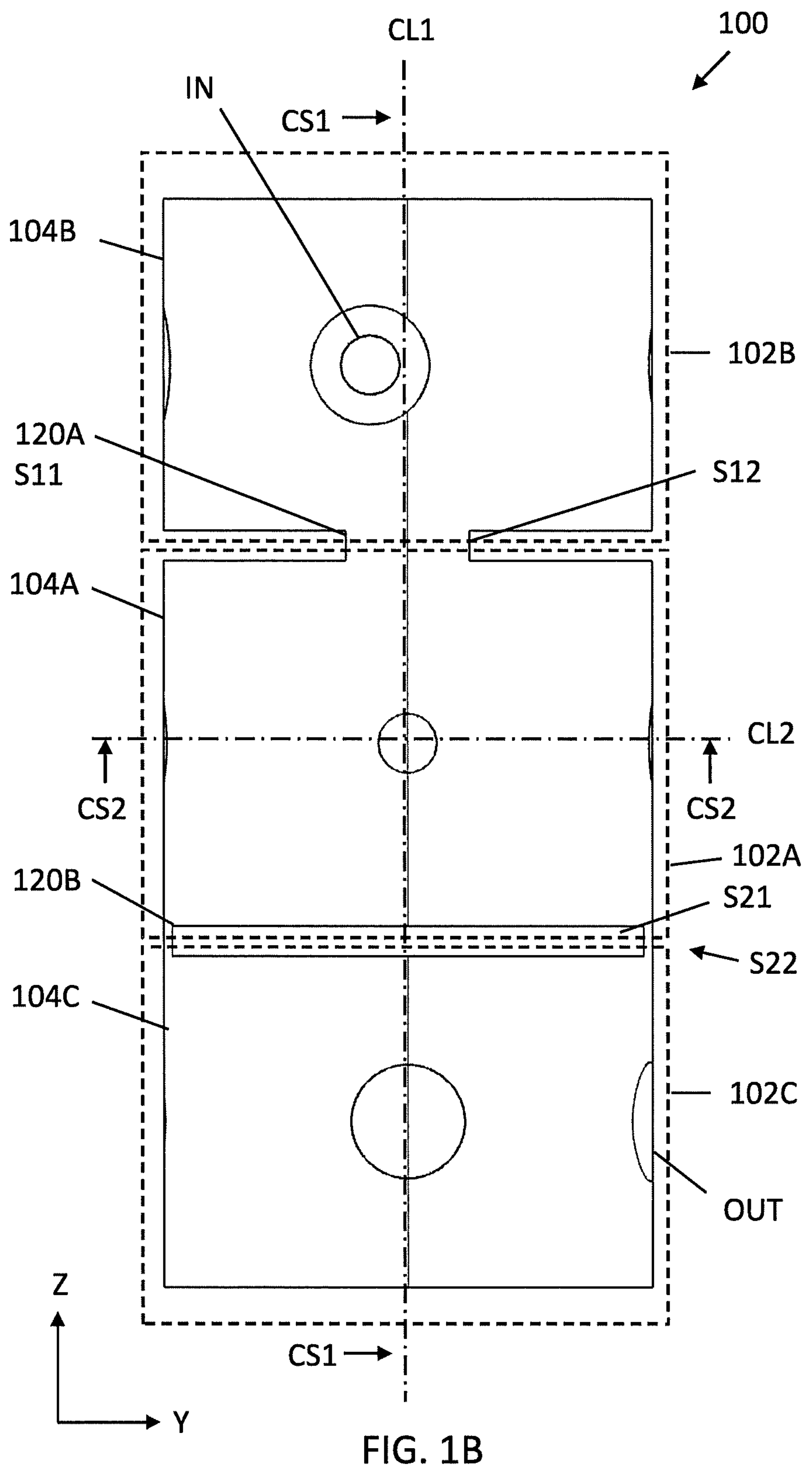

FIG. 1B illustrates directions of Z and Y, and FIG. 3 directions of X and Y which are used later in this application to clarify the resonator structure. The direction Z may be parallel with a first centre line CL1, the direction Y may be parallel with a second centre line CL2, and the direction X may be parallel with a third centre line CS3 of the structure.

According to an aspect, there is provided a dielectric resonator structure 100 comprising at least a first resonator 102A having a ceramic body 104A comprising a first, a second and a third internal cavity 106, 108, 110, wherein the first cavity 106 is arranged between the second and the third cavity 108, 110, and the body 104A further comprises a first hole 112A extending from the first cavity 106 through the body 104A, and a first opening 114A arranged between the second and the third cavity 108, 110.

Referring to FIG. 1A which illustrates the resonator structure 100 from a perspective view according to an embodiment. The resonator structure refers to the RF-filter formed of a plurality of the resonators. A shape of the resonator structure 100 may be cylindrical having a first and a second end E1, E2 joined by a curved outer surface OS. A diameter of the example structure of the resonator illustrated in FIG. 1A is 9.8 mm and a length 22 mm in the direction of CL1. A cross section of the curved surface (outer surface) of the resonator structure may be substantially round as illustrated for example in FIG. 3. The cross-sectional shape of the structure may also be ellipse or polygon, for example. The resonator structure may further comprise a mechanical support feature on the curved surface for positioning the structure in the manufacturing process. The mechanical feature may be a plane (flat surface), for example. The mechanical support feature may cover, at least party, the structure in direction Z. The feature is set against a surface on which the structure is manufactured to keep it in a right position. This feature may be mandatory for the additive manufacturing. This is not illustrated in Figures.

FIGS. 1A and 1B illustrates the resonator structure 100 according to one embodiment in which a part 102A comprises a dual mode cavity for resonators 1 and 2, a part 102B may be a single mode resonator and a part 102C may be a single mode coaxial resonator. The resonator structure may be made of the ceramic. An outer surface of the structure may be almost fully coated by a conductive layer. The resonator structure comprises an input IN and an output OUT holes with the conductive coating. A surface IN_S1 round the input hole IN and a surface OUT_S1 around the output hole may not be conductive. So, there may be non-conductive area around the input and output holes.

Let's now look at the part 102A in detail. In an embodiment, the part 102A is the first resonator 102A of the structure having the body 104A. The first resonator may be the dual mode resonator, so it may comprise two resonances. Let's now look at FIG. 2A which is a cross section of the resonator structure 100 in a direction CS1 illustrated in FIG. 1B. The first body 104A of the first resonator 102A may comprise at least the first, the second and the third internal cavities 106, 108, 110. The first cavity 106 may be arranged between the second 108 and the third 110 cavity in the Z-direction which is parallel with the centre line CL1 of the structure 100. The first cavity may not be in an air connection with the second and/or the third cavity. A size and shape of the second and third cavity may be the same, and different than a size and shape of the first cavity. The second and the third cavity may be configured to shift the Z-direction spurious TM-mode (transverse magnetic) resonance higher. Referring now to FIG. 2B, a diameter of the first cavity (in direction CL2) may be about half of a diameter of the body, for example. A length of the first cavity (in direction CL1) may be about (maximum) half of the diameter, for example. A diameter of the second and third cavity (in direction CL2) may be at least half of the diameter of the body, for example. A maximum length of the second and third cavity (in direction CL1) maybe half of the diameter of the cavities for example.

Figure 2A:
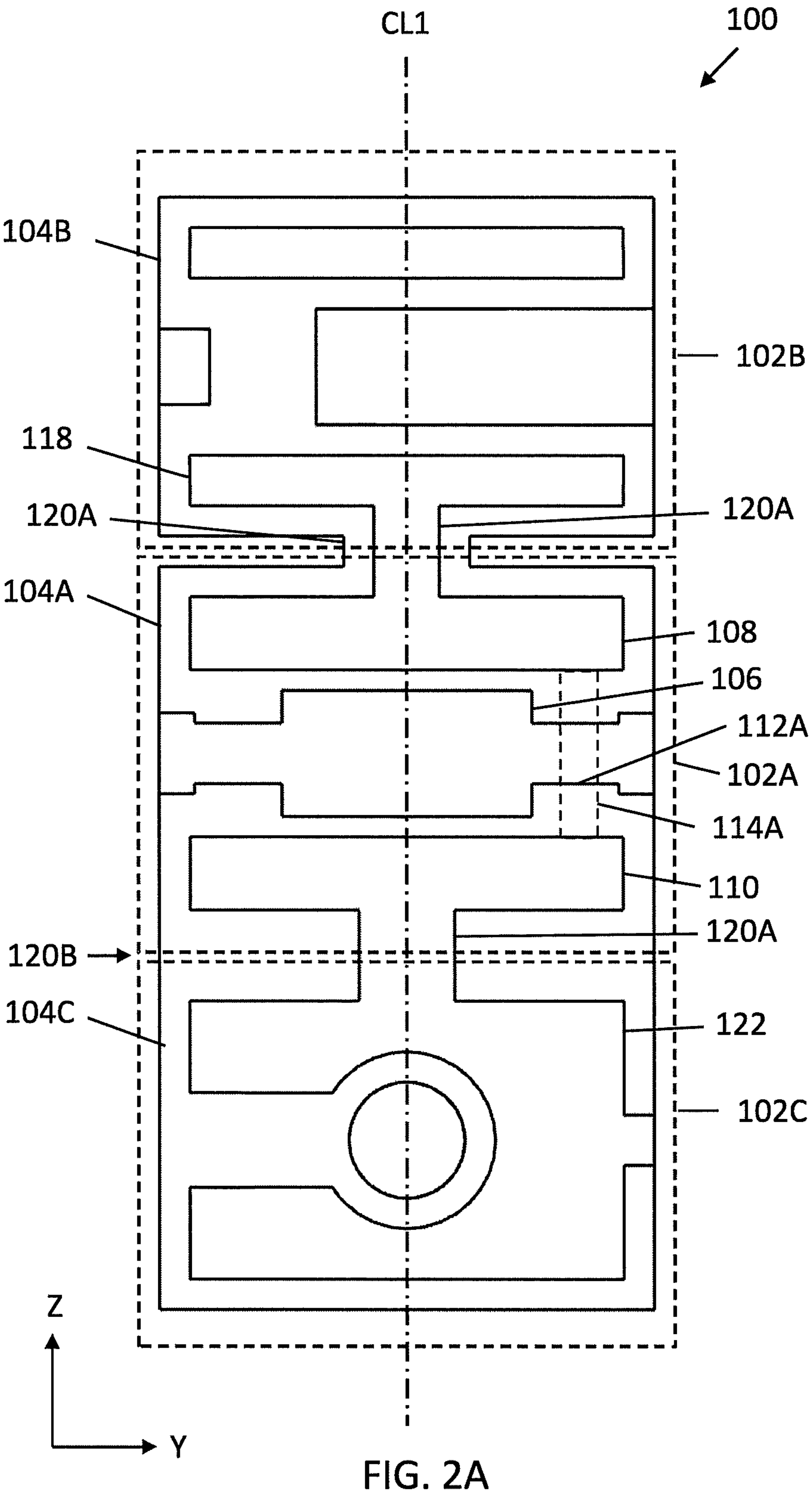
FIG. 2A illustrates a cross section of the dielectric resonator structure according to an embodiment of the invention.
Figure 2B:
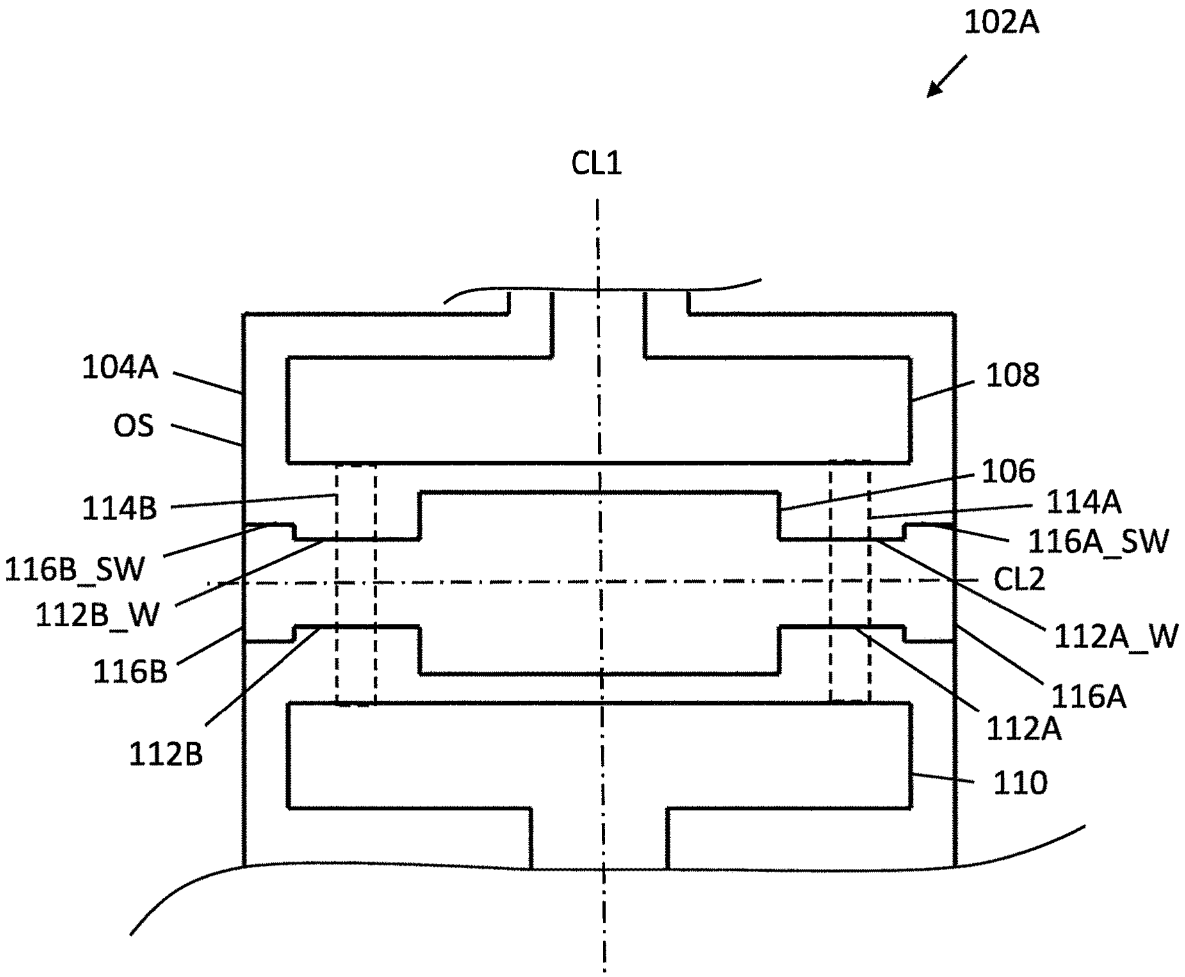
FIG. 2B illustrates a cross section of one resonator of the dielectric resonator structure according to an embodiment of the invention.

Still referring to FIG. 2A, the body 104A may further comprise the first hole 112A extending from the first cavity 106 through the body 104A. The hole 112A may be a through hole extending from the first cavity 106 to the outer surface OS of the body 104A of the first resonator 102A. A shape of the first hole 112A may substantially round. A size of the hole is substantially smaller than the size of the first cavity. A diameter of the hole may be 1-2 mm, for example. This means that a diameter of the first hole may be smaller than the size of the first cavity in the directions Z and X of the structure 100.

The body 104A of the first resonator 102A may further comprise the first opening 114A arranged between the second and the third cavity 108, 110 as illustrated for example in FIG. 2A. The first opening 114A may extend parallel with the Z-direction (centre line CL1) of the structure 100. The first opening 114A may not be in an air contact with the first cavity. A shape of the cross section of the first opening in the Z-direction of the structure may be rectangle as illustrated in FIG. 3, for example. In one embodiment, the first opening does not reach the second and/or the third cavity. In other words, the first opening may not be in the air contact with the second and/or the third cavity. In another embodiment, the first opening reaches the second and/or the third cavity. So, then it is in the air connection with the second and/or the third cavity.

In an embodiment, the first opening is a cavity (hole) on the outer surface of the body of the first resonator extending inside the body. The cavity may be arranged between the second and the third cavities on the outer side surface. The cavity may comprise a conductive coating. A shape of the cavity may be round, elliptic or polygon. The cavity may be elongated extending along the outer surface. This embodiment is not illustrated in Figures.

In an embodiment, the first opening is a cavity (hole) on a side wall of the first inner cavity extending towards the outer surface of the body. The side wall of the first cavity refers to the wall where the first hole is placed for example in FIG. 3. The cavity may comprise a conductive coating. A shape of the cavity may be round, elliptic or polygon. The cavity may be elongated extending along the side wall of the inner cavity. This embodiment is not illustrated in Figures.

Referring now to FIG. 2B which illustrates the first resonator 102A in more detail. According to an embodiment, the body 104A of the second resonator 102A further comprises a second hole 112B extending from the first cavity 106 through the body 104A. The second hole 112B may comprise, at least partly, the same features as the first opening 112A which are described above. The first and the second hole 112A, 112B may be arranged on the opposite sides of the first cavity 106 as illustrated in FIG. 2B. Hence, the first and the second holes may be the through holes extending from the first cavity, and the holes may have the same centre line CL2.

In an embodiment, illustrated in FIG. 2B, the first and/or the second hole 112A, 112B comprises a recess 118A, 118B on the outer side surface OS of the body 104A. A shape of the recess may be substantially round extending from the outer side surface towards the first cavity. The recess may be tapered such that a diameter of the recess getting smaller, at least partly, towards the bottom of the recess. A depth of the recess (in direction Y) may be substantially smaller than length of the first and/or the second hole. The recess may have the same centre line CL2 with the first and the second holes, so the recess is aligned with the hole.

In an embodiment, the first cavity 106 and a side wall 116A_SW, 116B_SW of the recess 116A, 116B are conductive. Hence, inner walls (surfaces) of the first cavity as well as the side walls (surfaces) of the recess may have the conductive coating. The side wall(s) 116A_SW, 116B_SW of the recess refer to the wall(s) that extends parallel with the centre line CL2 of the first and the second hole 116A, 116B as illustrated for example in FIG. 2B. Surface(s) of the recess (bottom of the recess) that are perpendicular to the centre line CL2 and parallel with the centre line CL1 may not be conductive.

The conductivity in the ceramic resonator may be achieved by the conductive coating. The coating may be silver, for example. The silver coating may further be sintered. For example, dipping and/or spraying may be used as a coating method. The dipping is preferred to get the proper coating layer also to the inner cavities. The conductive coating of the ceramic resonators is well known in the prior art and therefore it is not presented in detail in this application.

In an embodiment, walls 112A_W, 112B_W of the first and/or the second hole 112A, 112B are non-conductive (dielectric). This means that these walls (surfaces) may be without the conductive coating layer. The walls may be coated in the coating process, but the coating layer may be removed from the walls by machining afterwards. For example, the first and the second hole may be the round through hole and the conductive layer may be remove from the side walls of the holes by drilling. This may be taken into account in a dimension (diameter) of the hole(s). Masking may also be used to avoid coating in the non-conductive surfaces.

Still referring to FIG. 2B, in an embodiment, the body 104A further comprises a second opening 114B arranged between the second and the third cavity 108, 110. The second opening may comprise, at least partly, the same features as the first opening which are described above.

Figure 3:
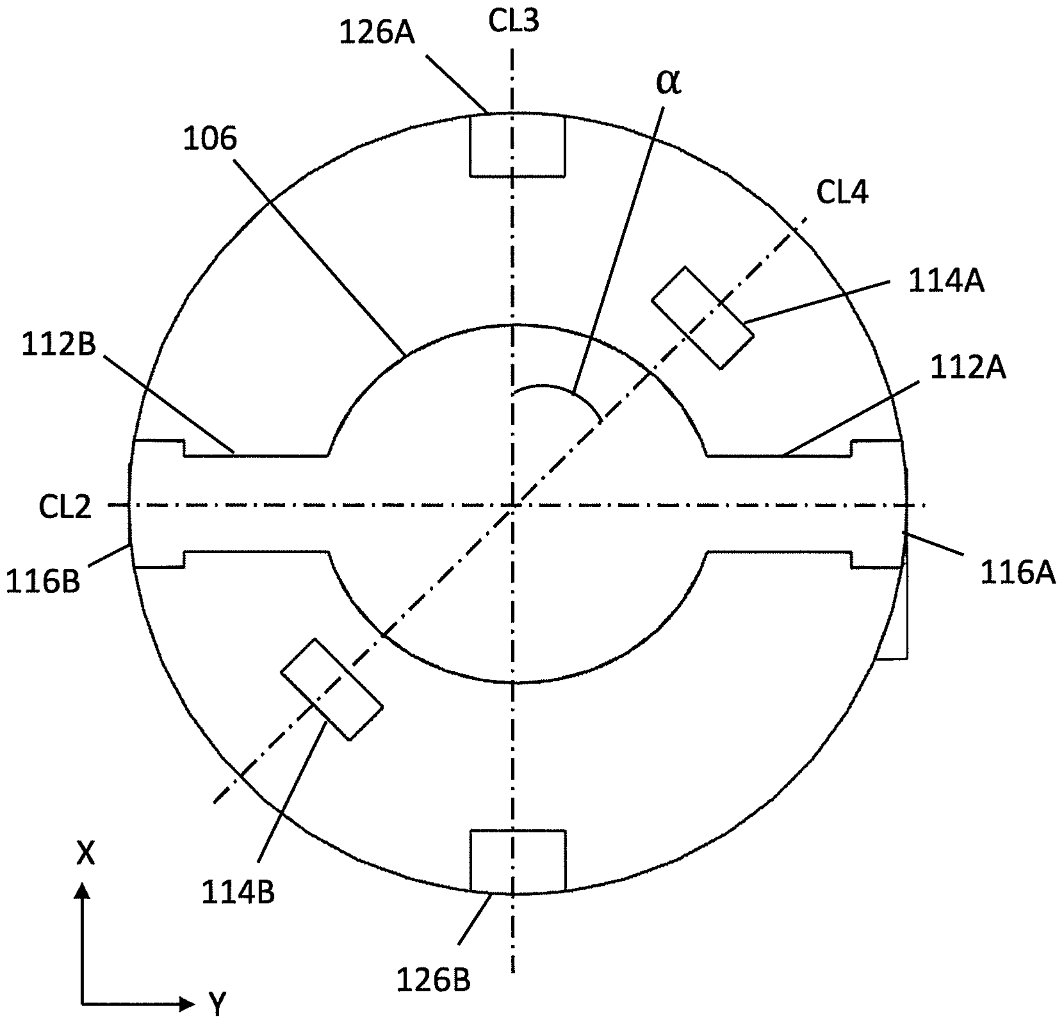
FIGS. 3 and 5 illustrate cross sections of cavities of the dielectric resonator structure according to an embodiment of the invention.

Referring now to FIG. 3 which is a cross section of the first resonator in the direction CS2 illustrated in FIG. 1B. The cross section is taken from the middle of the first cavity. The first and the second openings 114A, 114B may be arranged on the opposite sides of the first cavity 106. An angle α between the centre line CL2 of the first and second hole 112A, 112B and the centre line CL4 of the first and the second opening 114A, 114B may be about 45 degrees, for example. The openings both side of the first cavity breaks the symmetricity and causes coupling between orthogonal modes in the X- and Y-direction. As described, the openings may not go through the body, but they work more effectively when they are through. Anyway, the main idea is just to break the symmetry of the first cavity.

Still referring to FIG. 3, the centre line CL2 of the first and the second hole 112A, 112B divides the structure in two parts from the middle of the first cavity. Both sides may be substantially identical, in other words, the structure may be symmetrical.

In a first embodiment, the first and/or the second opening 114A, 114B are configured to extend from the second cavity 108 towards the third cavity 110. The first and/or the second opening may then be in the air connection with the second cavity but not with the third cavity. In a second embodiment, the first and/or the second opening 114A, 114B are configured to extend from the third cavity 110 towards the second cavity 108. Then the first and/or the second opening may be in the air connection with the third cavity but not with the second cavity. In a third embodiment, the first and/or the second opening 114A, 114B comprises a trough hole extending from the second cavity to the third cavity 108, 110. Then the first and/or the second opening is in the air connection with the second and the third cavity.

In an embodiment, walls (surfaces) of the second and the third cavity 108, 110 are non-conductive (dielectric). Hence, the inner surfaces of these cavities are not covered by the conductive coating layer. As described above, the first cavity, which may be coated by the conductive layer, may not be in the air connection with the second and/or the third cavity, so spreading of the coating from the first cavity can be avoided. In addition, the first and the second opening 114A, 114B may be non-conductive, and may not be covered by the conductive coating layer.

Let's now look at FIG. 2B, in an embodiment the first and the second holes 112A, 112B are perpendicular in relation to the centre line CL1 of the resonator structure 100. In other words, the centre line CL2 of the holes 112A, 112B and the centre line CL1 of the structure 100 are perpendicular. In addition, the first and the second hole may be substantially in the middle of the structure in the X-direction of the structure. Then the centre line CL2 of the holes intersects the centre line CL1 of the structure. In an embodiment, the first and the second opening 114A, 114B are parallel with the Z-direction of the resonator structure 100. Hence, the first and the second opening 114A, 114B are extending parallelly with the centre line CL1 of the structure 100.

Referring now to FIG. 3, in an embodiment a cross section of the first cavity 106 in the direction of CS2 is ellipse (oval). The shape may be symmetrical. Hence, the dimension of the first cavity 106 in the Y-direction is bigger that the dimension of the cavity in the X-direction as illustrated in FIG. 3. The elliptic shape may be symmetrical such that both sides of the cavity divided by the centre line CS2 may be identical. The elliptic shape is very good for a low resistive loss when the cavity is coated to be conductive.

In an embodiment, the first and/or the second hole 112A, 112B may be arranged in the first cavity such that the hole(s) is/are placed in spot(s) in which the diameter of the elliptic first cavity is the largest as illustrated in FIG. 3. This means that the elliptic first cavity may be arranged in the structure such that its largest diameter dimension is congruent with the centre line CL2 of the holes.

Figure 5:
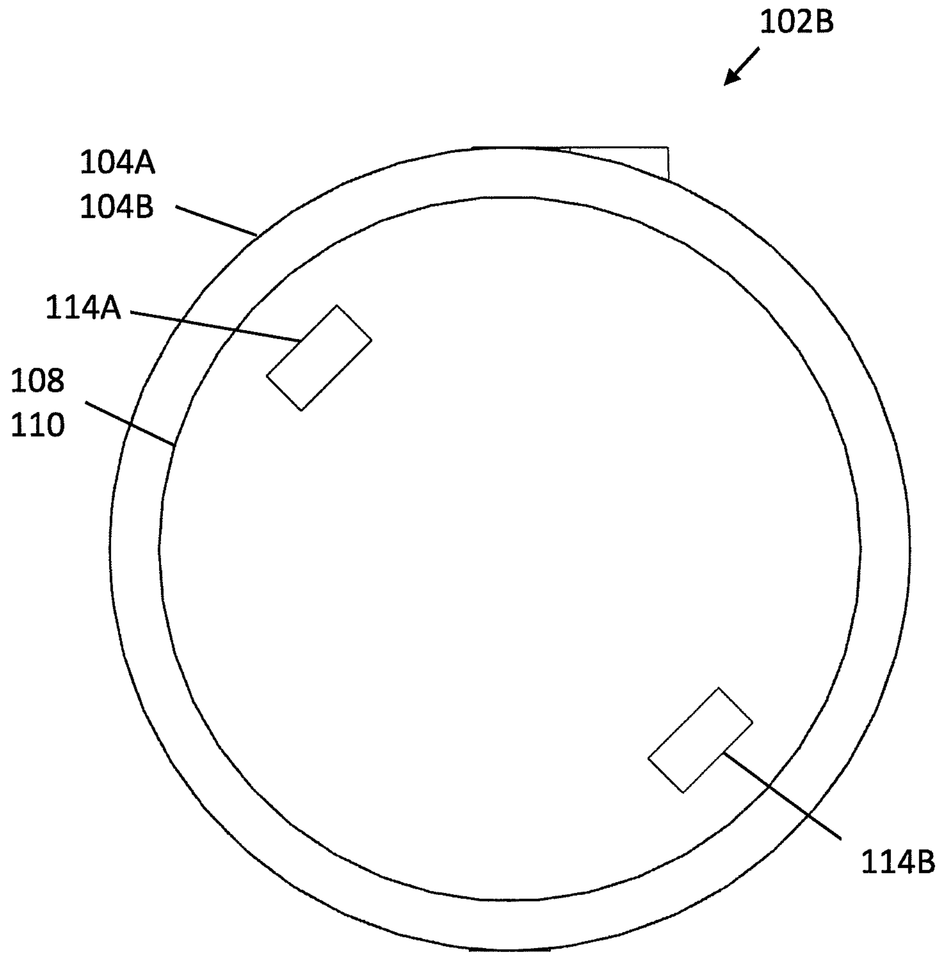

Referring now to FIG. 5 which is a cross sectional view of the second and the third cavity. The cross section is taken in centre line CL1 direction of the structure and is towards the first cavity. In an embodiment, the cross section of the second and third cavity 108, 110 in the above-mentioned direction is substantially round.

Hence, the first, the second, and the third cavity extends in the direction of the centre line CS1 of the cylindrical resonator structure creating the cylindrical hollow structure inside the resonator. A centre line of the cavities may be congruent with the centre line CS1 of the resonator structure. The cross section of the first cavity may be elliptic, and the cross section of the second and the third cavity may be round.

In an embodiment, the first resonator further comprises one or more outer holes 126A, 126B for tuning the resonator (s). Referring to FIG. 3, there may be a first and a second outer hole 126A, 126B in the first resonator. So, there may be one hole for each fundamental resonance. The resonance can be shifted higher by removing material from a bottom of hole(s). The outer holes may have the conductive coating. The outer holes may be arranged on the opposite sides of the resonator structure, such that they are in the middle of the first cavity in the Y- and the Z-direction of the structure. A centre line CL3 of the outer holes 126A, 126B may be perpendicular to the centre line CL2 of the first and the second hole 112A, 112B as illustrated in FIG. 3. The centre lines may also intersect each other.

Referring now to FIGS. 1A, 1B and 2A, in an embodiment, the dielectric resonator structure 100 further comprises at least a second resonator 102B in addition to the first resonator 120A. The second resonator 102B also has a ceramic body 104B comprising at least a fourth cavity 118. The body 104B of the second resonator 102B may have the same outer shape as the body 104A of the first resonator 102A. Let's now look at FIG. 4A, the bodies 104A, 104B of the first and the second resonator 102A, 102B may be coupled together by a first ceramic coupling part 120A. An area of a cross section of the coupling part 120A is smaller than an area of a cross section of the body 104A, 104B of the first and/or the second resonator 102A, 102B in the Z-direction of the resonator structure 100. Hence, the coupling part is substantially thinner than the bodies.

Figure 4A:
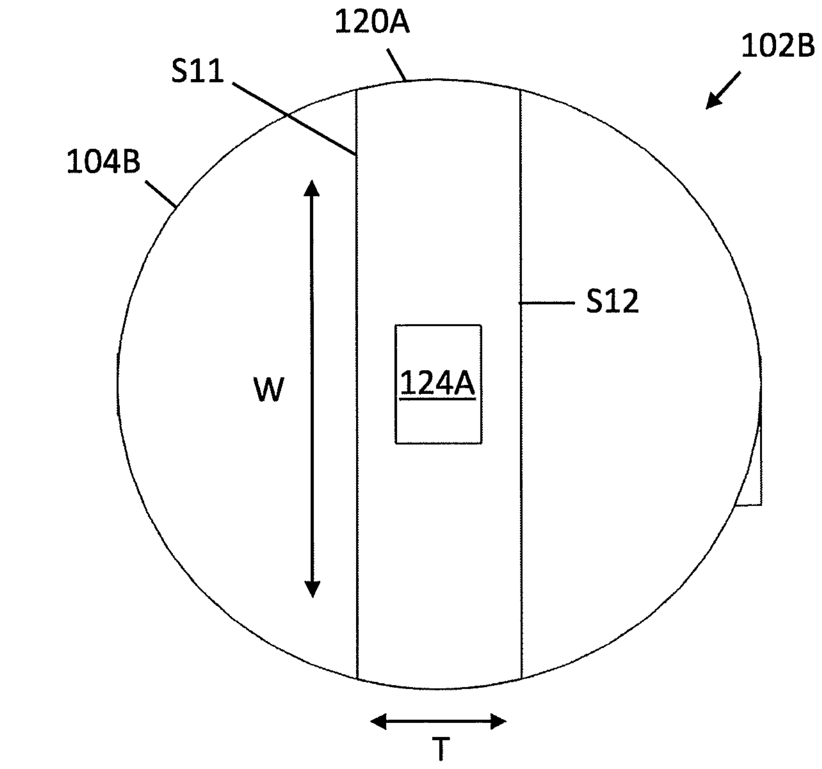
FIGS. 4A and 4B illustrate a cross section of coupling parts of the dielectric resonator structure according to an embodiment of the invention.
Figure 4B:
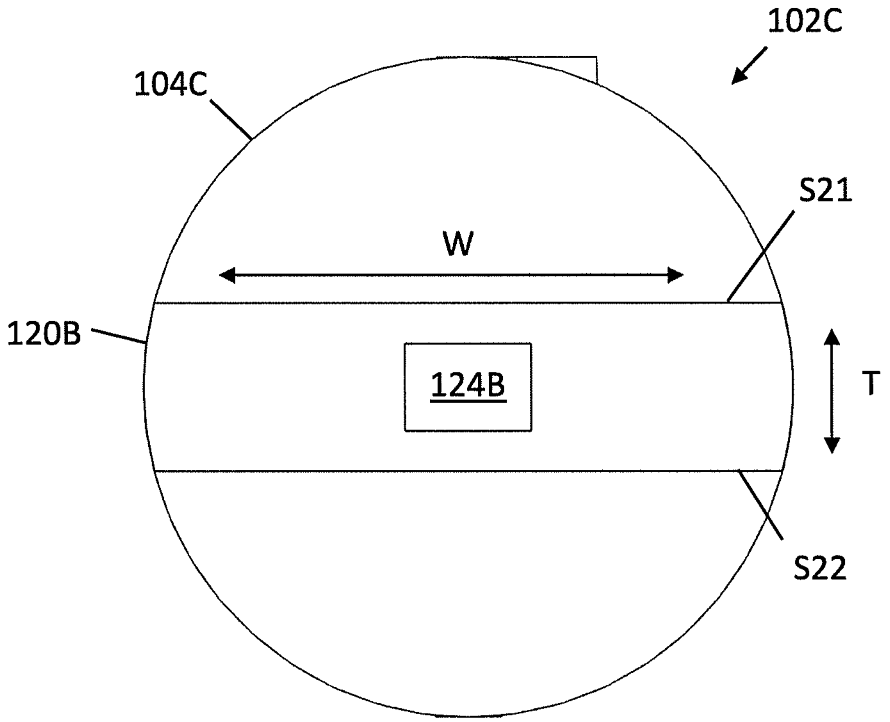

The coupling part may have two opposite straight sides (surfaces) S11, S21 wherein the distance between the straight sides is smaller than the diameter of the bodies. The distance between the sides may refer to a thickness T of the coupling part. A width W of the coupling part may refer to a dimension of the coupling in a direction which is parallel with the straight sides and is then perpendicular to the thickness. The width of the coupling part may be substantially the same as the diameter of the bodies. Hence, the cross-sectional shape (in Z-direction of the structure) of the coupling part may be substantially rectangular but end sides (surfaces) may be curved following the curved outer shape of the bodies of the resonator(s) as can be seen in FIGS. 4A and 4B. The end side refers to the side, which is perpendicular to the straight sides connecting them together.

Referring to FIGS. 1A, 1B and 2A, in an embodiment the dielectric resonator structure 100 further comprises at least a third resonator 102C in addition to the first and the second resonators 102A, 102B. The third resonator 102C also has a ceramic body 104C comprising at least a fifth cavity 122. The body 104C of the third resonator 102C may have the same outer shape as the body 104A, 104B of the first and the second resonator 102A, 102B. The first resonator 102A may be in the middle of the second and third resonators 102B, 102C. So, the first resonator 102A may be arranged between the second and the third resonators 102B, 102C in the Z-direction of the structure 100.

The bodies 104A, 104C of the first and the third resonators 102A, 102C may be coupled by a second ceramic coupling part 120B. Let's now look at FIG. 4B, the coupling part may have two opposite straight sides S12, S22, wherein an area of a cross section of the second coupling part 120B is smaller than an area of a cross section of the body 104A, 104C of the first and/or the third resonator 102A, 102C in the Z-direction of the resonator structure 100. Hence, the first and the second coupling parts may be substantially similar, but the first coupling part is between the first and the second resonators, and the second coupling part is between the first and the third resonators.

In an embodiment, two opposite side edged S21, S22 of the second coupling part 120B are perpendicular in relation to the two opposite side edged S11, S12 of the first coupling part 120A as can be seen for example in FIGS. 1A, 4A and 4B. As described, the coupling member may form the rectangular shape with the curved end surfaces, and the rectangle of the first coupling part may be perpendicular in relation to the rectangle of the second coupling part.

Referring to FIGS. 4A and 4B, in an embodiment the dielectric resonator structure 100 comprises a non-conductive hole 124A, 124B in the first and/or the second coupling part 120A, 120B. The non-conductive hole may refer to so called iris. The term "iris part" may refer to the coupling part(s) with the non-conductive hole(s) (iris). The non-conductive hole 124A, 124B is configured to extend through the first and/or the second coupling part from the second cavity 108 to the fourth cavity 118 and/or from the third cavity 110 to the fifth cavity 122. A length of the hole 122A, 128B in a direction of the opposite straight sides S11, S21, S12, S22 is substantially smaller than a length of the straight sides S11, S21, S12, S22. In other words, dimensions of the hole in the width W and the thickness T directions of the coupling part are smaller than the width and thickness of the coupling part. For example, a maximum width of the hole (W) may be about half of the length of the straight sides. A cross sectional shape of the hole in the longitudinal direction may be substantially rectangular.

In an embodiment, the first and/or the second coupling part 120A, 120B comprises more than one non-conductive hole 124A, 124B. For example, there may be a plurality of small holes instead of one big hole.

In an embodiment, the dielectric resonator structure 100 is made of one piece of the ceramic. As described, the resonator structure is the RF-filter comprising one or more resonators. There may be also more than three resonators in the same structure. The term "one piece" refers to the structure which comprises only one piece of material. In other words, the ceramic structure comprises only one part in which all the above-mentioned features are.

In an embodiment, the structure is made of one piece of ceramic material by the additive manufacturing.

Figure 6A:
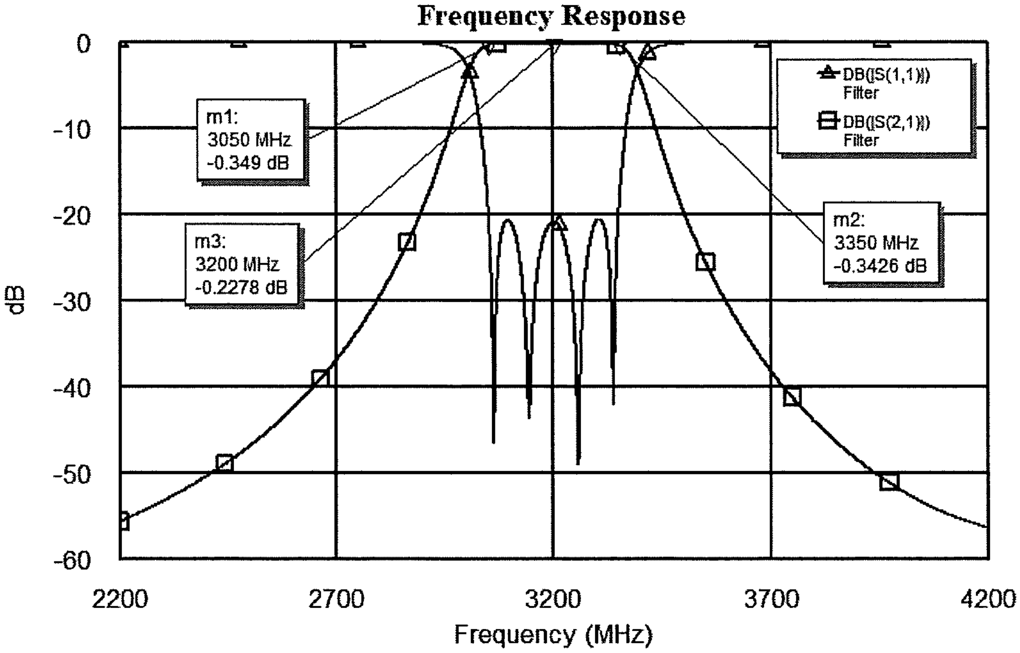
FIGS. 6A, 6B and 6C illustrate electrical properties of the dielectric resonator structure according to the invention.
Figure 6B:
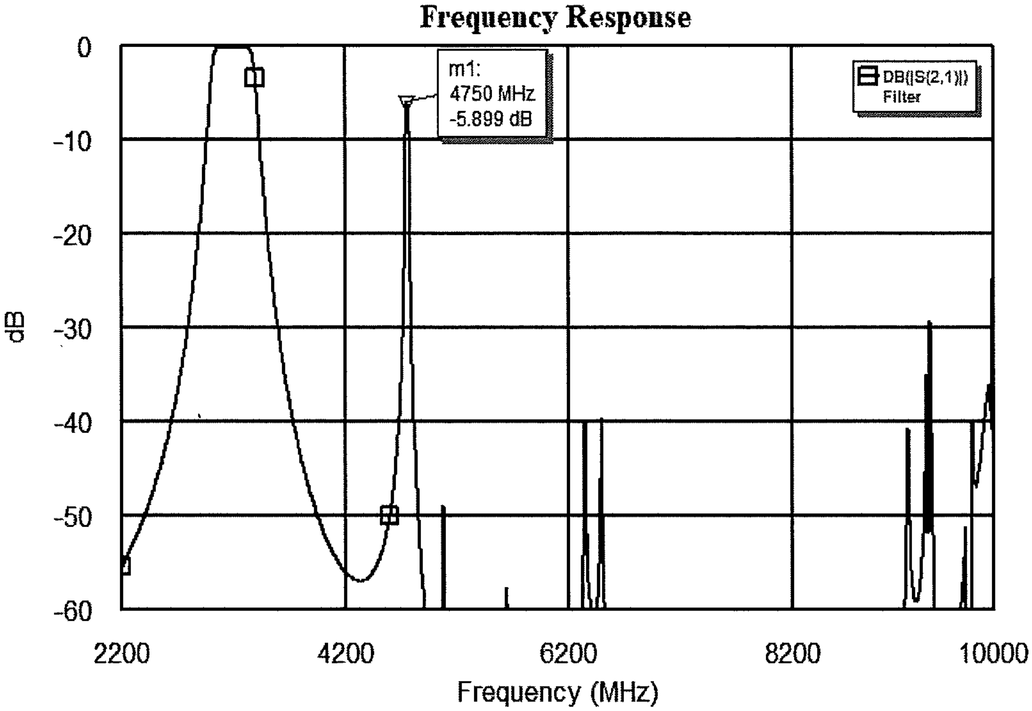
Figure 6C:
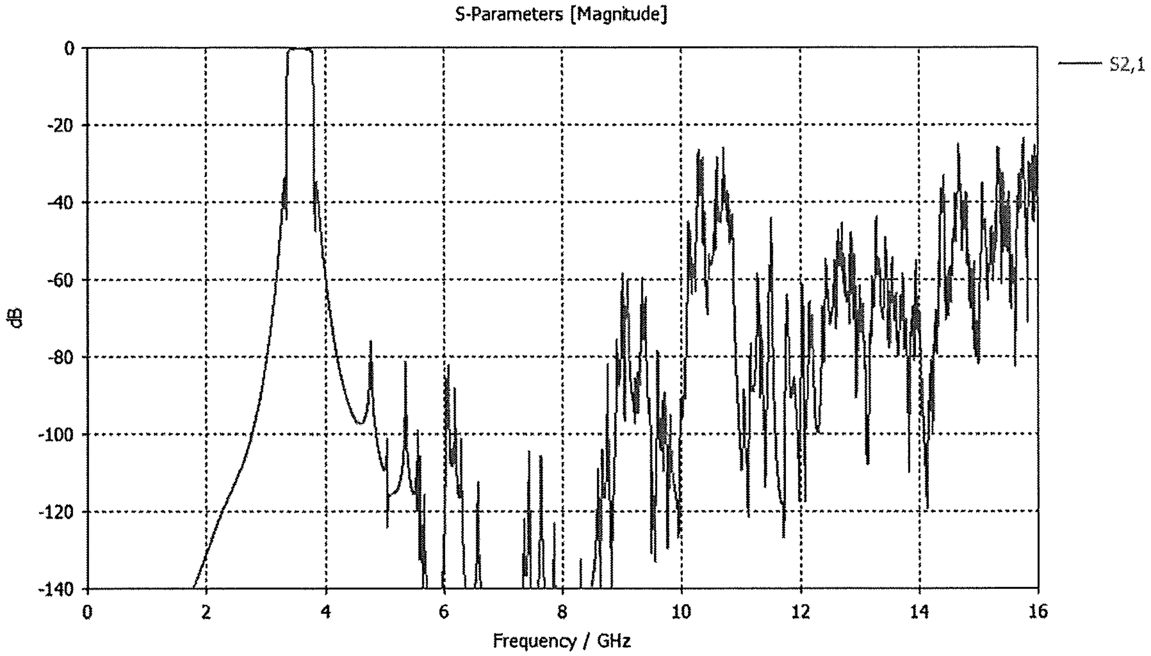

Let's now look at electrical properties of the resonator structure. FIGS. 6A, 6B and 6C illustrate an electromagnetic 3D simulation of the 4 resonators filter design according to the invention. Figures illustrates a forward (S21) and a reflection (S11) S-parameter responses over a pass band range and up to 14 GHz. As can be seen in the simulations, matching is excellent and an insertion loss low. A high frequency attenuation is broad up to 3*Fc except at 4.75 GHz where the attenuation may be improved by separating spurious resonances. In addition, a higher resonator number, which is needed in typical 5G radio antenna filter, will automatically improve attenuation as illustrated in FIG. 6C. The filter presented in FIG. 6C comprises 9-resonators, 3 pcs single mode resonators and 3 pcs dual mode resonator cavities. A diameter of this filter may be 9.8 mm and a length 43.5 mm, for example.

The ceramic filter structure according to the invention includes the dual mode resonator structure with a hollow structure inside forming the cavities. The (inner) surface(s) of the hollow structure may be metal plated to reduce the dimensions of the filter. The resonator is so called conductor loaded dual mode resonator. The metal plated part is used to tune resonance frequencies of the dual mode cavity. The hollow cavity may be a non-symmetrical to get independent frequency tuning to both modes. An ideal shape of the cavity may be a balloon, a disc or an elliptic for example, but other shapes are possible to use as well. Outer surface of the resonator structure (RF-filter) is fully or at least partly plated by metal. For example, areas around the IN and OUT holes may be without the plating. To get very wide coupling between the dual mode cavities, and between the TEM (transverse electromagnetic) single mode and dual mode cavities, there is utilized iris part TM (transverse magnetic) mode resonance. Driving the spurious resonance of the iris area near the pass band strengthens coupling of the fundamental modes both side of iris strongly.

In the iris part the ceramic area is much longer comparing to open area (hole). A spurious resonance, due to the iris area dimensions, is utilized to get the wide coupling. A magnetic field coupling take place mainly thru the iris and it does not affect much is the material in the iris ceramic or air. The narrow and long iris filled by ceramic material causes the TM mode spurious resonance at iris area between the dominant modes. If it is close to the pass band, it increases much the coupling. This phenomenon can be utilized to get strong coupling between the dominant modes.

When very strong coupling is needed the iris part is done as long as possible by the wide hole. If the coupling isn't enough, the dimension(s) of the hole is decreased to shift the spurious resonance nearer to the pass band to strengthen the dominant modes coupling like in the described filter.

The filter can have one or more TEM mode cavities to get easy input/output coupling. TEM mode resonators clean spurious modes and wide stop band attenuation can be achieved above the pass band.

Plating of the cavities inside the structure can be done by dipping the part (structure) into liquid metal (silver) and sintering the part. Plating can be removed plating from non-conductive hole(s) by boring or grinding. Plating may also be sprayed with a small size needle type of head instead of the dipping process.

As described above, the invention described above provides very effective dielectric resonator structure which is small and light. The small and light structure of the resonator enables also smaller and lighter structure of the RF-filter assemblies. Despite the small size, the resonator structure can provide excellent electrical properties.

It will be obvious to a person skilled in the art that, as technology advances, the inventive concept can be implemented in various ways. The invention and its embodiments are not limited to the examples described above but may vary within the scope of the claims.

The invention claimed is:

1. A dielectric resonator structure comprising:

at least a first resonator having a cylindrical ceramic body comprising a first, a second and a third internal cavity extending inside the body and forming a hollow structure, wherein the first cavity is arranged between the second and the third cavity in a direction of a center line of the structure, and the body further comprises a first hole extending from the first cavity through the body, and a first opening arranged between the second and the third cavity.

2. The dielectric resonator structure of claim 1, wherein a cross section of the cylindrical body is at least one of substantially round, ellipse, or polygon.

3. The dielectric resonator structure of claim 1, wherein the body further comprises a second hole extending from the first cavity through the body, wherein the first and the second holes are arranged substantially on opposite sides of the first cavity.

4. The dielectric resonator structure of claim 3, wherein at least one of the first or the second hole comprises a recess on an outer surface of the body.

5. The dielectric resonator structure of claim 4, wherein the first cavity and a side wall of the recess are conductive, and a wall of at least one of the first or the second hole is non-conductive.

6. The dielectric resonator structure of claim 3, wherein the body further comprises a second opening arranged between the second and the third cavity, wherein the first and the second openings are arranged substantially on the opposite sides of the first cavity.

7. The dielectric resonator structure of claim 6, wherein at least one of the first or the second opening is a through hole between the second and the third cavity.

8. The dielectric resonator structure of claim 6, wherein the first and the second hole are perpendicular in relation to the center line of the resonator structure, and the first and the second opening are parallel with the center line of the resonator structure.

9. The dielectric resonator structure of claim 1, wherein the first opening is configured to extend between the second and the third cavity and parallel with the center line of the structure.

10. The dielectric resonator structure of claim 1, wherein walls of the second and the third cavities and the first and the second openings are non-conductive.

11. The dielectric resonator structure of claim 1, wherein a cross section of the first cavity in a direction of the center line of the resonator structure is elliptic.

12. The dielectric resonator structure of claim 1, wherein the dielectric resonator structure further comprises at least a second resonator having a ceramic body comprising a fourth cavity, wherein the bodies of the at least the first and the at least the second resonator are coupled with a first ceramic coupling part having two opposite straight sides, wherein an area of a cross section of the coupling part is smaller than an area of a cross section of the body of at least one of the at least the first or the at least the second resonator in the direction of the center line of the resonator structure.

13. The dielectric resonator structure of claim 12, wherein the dielectric resonator structure further comprises at least a third resonator having a ceramic body comprising a fifth cavity, wherein the at least the first resonator is arranged between the at least the second and at least the third resonator, and wherein the bodies of the at least the first and the at least the third resonators are coupled with a second ceramic coupling part having two opposite straight sides, wherein an area of a cross section of the second coupling part is smaller than an area of a cross section of the body of at least one of the at least the first or the at least the third resonator in the direction of the center line of the resonator structure, and wherein the two opposite side edged, of the second coupling part are perpendicular in relation to the two opposite side edged of the first coupling part.

14. The dielectric resonator structure of claim 13, wherein the dielectric resonator structure comprises at least one non-conductive hole in at least one of the first or the second coupling part extending from at least one of the second cavity to the fourth cavity or from the third cavity to fifth cavity, and wherein a length of the hole in a direction of the opposite straight sides is substantially smaller than a length of the straight sides.

15. The dielectric resonator structure of claim 1, wherein the resonator structure is made of one piece of ceramic.

16. The dielectric resonator structure of claim 1, wherein the resonator structure is made with an additive manufacturing.

* * * * *